United States Patent
Au et al.

(10) Patent No.: US 10,945,244 B2
(45) Date of Patent: *Mar. 9, 2021

(54) SYSTEM AND METHOD FOR SMALL TRAFFIC TRANSMISSIONS

(71) Applicant: Huawei Technologies Co., Ltd., Shenzhen (CN)

(72) Inventors: Kelvin Kar Kin Au, Kanata (CA); Jianglei Ma, Ottawa (CA); Hosein Nikopour, San Jose, CA (US); Alireza Bayesteh, Ottawa (CA); Petar Djukic, Nepean (CA); Liqing Zhang, Ottawa (CA); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,637

(22) Filed: Apr. 25, 2018

(65) Prior Publication Data

US 2018/0242310 A1 Aug. 23, 2018

Related U.S. Application Data

(63) Continuation of application No. 13/911,716, filed on Jun. 6, 2013.

(51) Int. Cl.
*H04W 72/04* (2009.01)
*H04W 74/08* (2009.01)
*H04L 1/00* (2006.01)

(52) U.S. Cl.
CPC ....... *H04W 72/0413* (2013.01); *H04L 1/0045* (2013.01); *H04W 72/042* (2013.01); *H04W 74/0866* (2013.01); *H04W 72/0466* (2013.01)

(58) Field of Classification Search
None
See application file for complete search history.

(56) References Cited

U.S. PATENT DOCUMENTS

| | | | |
|---|---|---|---|
| 7,457,588 B2 | 11/2008 | Love et al. | |
| 2008/0212514 A1* | 9/2008 | Chen | H04L 1/1887 370/315 |

(Continued)

FOREIGN PATENT DOCUMENTS

| | | |
|---|---|---|
| CN | 101272602 A | 9/2008 |
| CN | 101534508 A | 9/2009 |

(Continued)

OTHER PUBLICATIONS

"3rd Generation Partnership Project; Technical Specification Group Radio Access Network; Spreading and modulation (FDD) (Release 11)," 3GPP TS 25.213, V11.3.0, Sep. 2012, 43 pgs.

(Continued)

*Primary Examiner* — Yemane Mesfin
*Assistant Examiner* — Jeff Banthrongsack
(74) *Attorney, Agent, or Firm* — Slater Matsil, LLP

(57) ABSTRACT

A grant-free transmission mode may be used to communicate small traffic transmissions to reduce overhead and latency. The grant-free transmission mode may be used in downlink and uplink data channels of a wireless network. In the downlink channel, a base station transmits packets to a group of UEs in a search space without communicating any transmission code assignments to the UEs. The UEs receive the downlink packets using blind detection. In the uplink channel, UEs transmit packets in an access space using assigned access codes which are either independently derived by the UEs or otherwise communicated by the base station using a slow-signaling channel. Hence, the grant-free transmission mode allows mobile devices to make small (Continued)

traffic transmissions without waiting for uplink grant requests.

26 Claims, 6 Drawing Sheets

Related U.S. Application Data

(60) Provisional application No. 61/737,636, filed on Dec. 14, 2012.

(56) References Cited

U.S. PATENT DOCUMENTS

| | | | |
|---|---|---|---|
| 2009/0204862 A1 | 8/2009 | Chun | |
| 2010/0232388 A1 | 9/2010 | Nakao et al. | |
| 2011/0039568 A1* | 2/2011 | Zhang | H04W 72/1268 455/452.1 |
| 2011/0194525 A1 | 8/2011 | Nishio et al. | |
| 2011/0199995 A1 | 8/2011 | Ito et al. | |
| 2011/0200004 A1 | 8/2011 | Nakashima et al. | |
| 2011/0223924 A1* | 9/2011 | Lohr | H04W 72/1289 455/450 |
| 2012/0127946 A1 | 5/2012 | Nishio et al. | |
| 2013/0022012 A1 | 1/2013 | Lee et al. | |
| 2013/0155968 A1 | 6/2013 | Pelletier et al. | |
| 2013/0176952 A1 | 7/2013 | Shin et al. | |
| 2014/0254455 A1 | 9/2014 | Nikopour et al. | |

FOREIGN PATENT DOCUMENTS

| | | | |
|---|---|---|---|
| CN | 101932024 A | 12/2010 | |
| CN | 102740473 A | 10/2012 | |
| JP | 2010516207 A | 5/2010 | |
| JP | 2012213172 A | 11/2012 | |
| JP | 2013522940 A | 6/2013 | |
| WO | 2009025525 A1 | 2/2009 | |
| WO | 2010057540 A1 | 5/2010 | |
| WO | 2010087666 A2 | 8/2010 | |
| WO | 2011120443 A1 | 10/2011 | |
| WO | 2011126351 A2 | 10/2011 | |
| WO | WO-2011120443 A1 * | 10/2011 | ........ H04W 74/0841 |
| WO | 2012092721 A1 | 7/2012 | |

OTHER PUBLICATIONS

"3rd Generation Partnership Project; Technical Specification Group Radio Access Network; Physical layer procedures (FDD) (Release 11)," 3GPP TS 25.214 v11.3.0, Sep. 2012, 112 pgs.

"3rd Generation Partnership Project; Technical Specification Group Radio Access Network; Evolved Universal Terrestrial Radio Access (E-UTRA); Physical layer procedures (Release 10)," 3GPP TS 36.213 V10.7.0, Sep. 2012, 126 pages.

3GPP TSG RAN WG2 #69, "Discussion on Contention Resolution of CB Transmission," R2-101101, ZTE, San Francisco, USA, Feb. 22-26, 2010, 4 pages.

3GPP TSG-RAN WG2 Meeting # 69, "SR Associated Contention Based Transmission," R2-101115, Nokia Siemens Networks, Nokia Corporation, San Francisco, U.S.A., Feb. 22-26, 2010, 3 pages.

Qualcomm Europe, "HS-SCCH-less HS-PDSCH Operation for Improved Support of IMS Real-Time Services," 3GPP TSG-RAN WG1 #43; R1-05-1511, Nov. 7-11, 2005, 7 pgs.

Fujitsu: "EPDCCH Search Space Design to Support Narrow Band Operation," 3GPP TSG RAN WG #68, R1-120764, Feb. 6-10, 2012, 2 pages, Dresden, Germany.

Ericsson et al., "Contention based uplink transmissions", 3GPP TSG-RAN WG2 #66bis, R2-093812, Jun. 29-Jul. 3, 2009, 4 Pages, Los Angeles, USA.

* cited by examiner

SYSTEM AND METHOD FOR SMALL TRAFFIC TRANSMISSIONS

This patent application is a continuation of U.S. Non-provisional application Ser. No. 13/911,716, filed on Jun. 6, 2013, entitled "System and Method for Small Traffic Transmissions," which claims the benefit of U.S. Provisional Application No. 61/737,636 filed on Dec. 14, 2012, entitled "System and Method for Small Traffic Transmissions," which applications are incorporated herein by reference as if reproduced in its entireties.

TECHNICAL FIELD

The present invention relates to a system and method for wireless communications, and, in particular embodiments, to a system and method for small traffic transmissions.

BACKGROUND

In third generation partnership (3GPP) long term evolution (LTE) networks, both downlink (DL) and uplink (UL) transmissions utilize scheduling-based access, meaning that network resources (e.g., time-frequency resources) are allocated for each transmission. Two types of data transmission mechanisms are supported in current LTE. (1) Dynamic scheduling based transmission to take advantage of fast link adaptation to boost system capacity. (2) Semi-persistent scheduling based transmission to save the signaling overhead.

The scheduling-based access typically comprises either dynamic scheduling or semi-static scheduling. In dynamic scheduling, the user equipment (UE) and base station (BS) will communicate grant based signaling for each transmission time interval (TTI).

SUMMARY

Technical advantages are generally achieved, by embodiments of this disclosure which describe a system and method for small traffic transmissions.

In accordance with an embodiment, a method for communicating data is provided. In this example, the method includes allocating resources of a downlink channel as a search space for a group of mobile devices; assigning a first transmission code to a first mobile device; and transmitting a packet over the resources in accordance with the first transmission code without communicating transmission code assignments to the first mobile device. The first mobile device is configured to receive the packet using blind detection. An apparatus for performing this method is also provided.

In accordance with another embodiment, another method for communicating data is provided. In this example, the method includes identifying a search space for a group of mobile devices. The search space includes resources of a downlink channel. The method further includes determining a set of candidate transmission codes associated with the search space, and receiving a packet communicated in the search space using blind detection. The search space comprises resources of a downlink channel, and the packet is communicated in accordance with a first transmission code in the set of candidate transmission codes. An apparatus for performing this method is also provided.

In accordance with yet another embodiment, yet another method for communicating data is provided. In this example, the method includes identifying an access space for a group of mobile devices. The access space comprises resources of an uplink channel. The method further comprises determining a first transmission code in a set of transmission codes for a first mobile device in the group of mobile devices, and transmitting a packet over the resources of the uplink channel using the first transmission code without obtaining an uplink grant. An apparatus for performing this method is also provided.

In accordance with yet another embodiment, yet another method for communicating data is provided. In this example, the method includes identifying an access space for a group of mobile devices. The access space comprises resources of an uplink channel. The method further comprises identifying a set of transmission codes associated with access space, and receiving packets communicated over the resources of the uplink channel using blind detection. An apparatus for performing this method is also provided.

In accordance with yet another embodiment, a method for advertising grant-free communication mode capabilities is provided. In this example, the method includes communicating capability information between a mobile device and a base station. The capability information indicates a grant-free communication mode capability. The method further comprises communicating grant-free signaling parameters between the mobile device and the base station. The grant-free signaling parameters define a search space or an access space for the grant-free communication mode. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
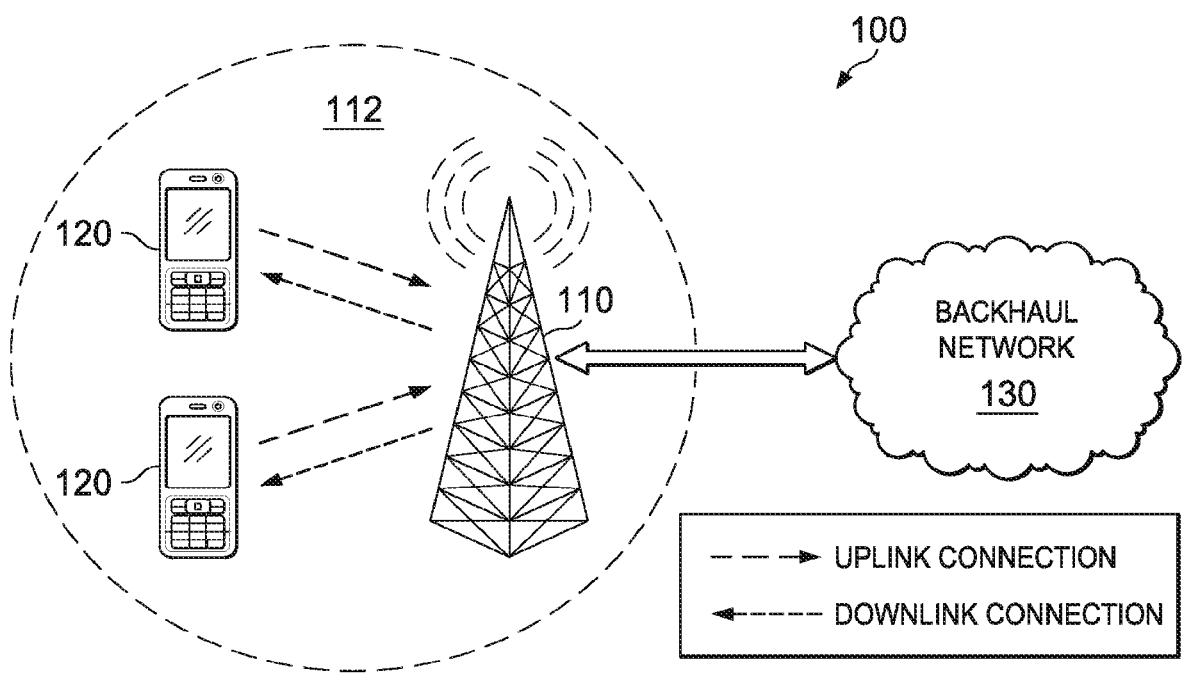
FIG. 1 illustrates a diagram of a wireless network for communicating data.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Many future applications will rely on small packet transmissions, including for example, real time gaming, instant messaging, machine-to-machine (M2M) communications, status update messaging, etc. Small packet communications cannot be supported efficiently, however, with existing transmission schemes. Dynamic signal overhead increases with the reduction of the data load per packet. This increase can be by as much as 50%. Semi-persistent scheduling cannot meet the QoE requirements for delay sensitive small traffic transmission.

In semi-static scheduling, the UE and BS will communicate grant based signaling for blocks of TTIs. Dynamic scheduling may allow the UE and BS to achieve fast link adaptation, while semi-static signaling may produce less signaling overhead.

In both dynamic and semi-static scheduling, the grant based signaling is communicated via a physical uplink control channel (PUCCH) and/or physical downlink control channel (PDCCH). More specifically, downlink transmission parameters, (e.g., modulation and coding scheme (MCS), channel resource allocation, multiple-input multiple output (MIMO) transmission mode, etc.) and uplink grant assignments are traditionally communicated through the PDCCH, while uplink grant requests are signaled through the PUCCH. Many future applications will rely on small packet transmissions, including for example, real time gaming, instant messaging, machine-to-machine (M2M) communications, status update messaging, etc. Communicating small packet transmissions using conventional scheduling-based transmission techniques may be relatively inefficient and/or undesirable. More specifically, dynamic scheduling may generate significant amounts of overhead compared to the small packet communication's payload size, while semi-persistent scheduling may be unable to meet the QoS requirements for delay sensitive small traffic transmission. Accordingly, an alternative communication scheme for small packet transmissions is desired.

Various embodiments provide an efficient transmission mechanism to enhance the spectrum for small packet transmission. An embodiment provides a shared resource-based scheduling free transmission mode for downlink (DL) small packet transmission. An embodiment provides contention-based grant-free transmission mode for uplink (UL) small packet transmission. In various embodiments, scheduling free DL transmission eliminates dynamic scheduling signaling overhead for small packet transmission. In various embodiments, grant-free UL transmission eliminates transmission request signaling overhead and scheduling grant signaling overhead. Aspects of this disclosure provide a grant-free transmission mode for small traffic transmissions in downlink and uplink data channels of a wireless network. In the downlink channel, a base station transmits packets to a group of UEs in a search space without communicating any transmission code assignments to the UEs. The UEs receive the downlink packets using blind detection. In the uplink channel, UEs transmit packets in an access space using assigned access codes which are either independently derived by the UEs or otherwise communicated by the base station using a slow-signaling channel. In any event, UEs can make small traffic transmissions without waiting for uplink grant requests. In this disclosure, grant-free transmissions refer to data transmissions that are performed without communicating grant-based signaling in a dynamic control channel, such as a PUCCH or PDCCH. Grant-free transmissions can include uplink or downlink transmissions, and should be interpreted as such unless otherwise specified.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
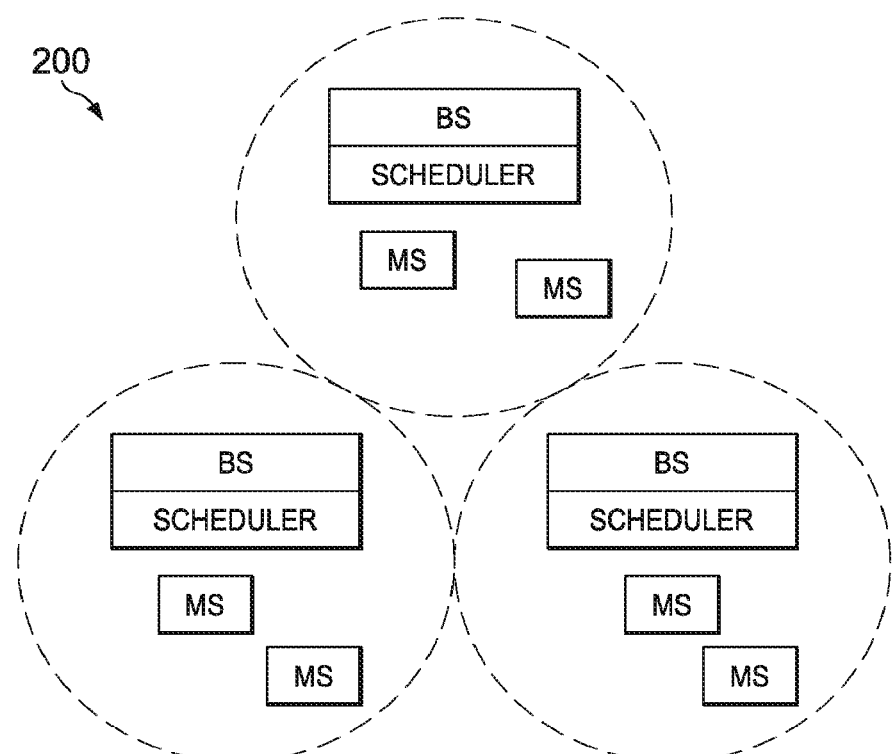
FIG. 2 illustrates a diagram of another wireless network for communicating data.

FIG. 2 illustrates a wireless communications network 200 comprising a plurality of base stations (BS) providing voice and/or data wireless communication service to a plurality of mobile stations (MSs). The BSs may be referred to by other names such as access network (AN) elements, access points (APs), Node-Bs, eNBs, or any other network device configured to communicate with MSs in the wireless communications network 200. Each BS has a corresponding coverage area for communicating data, and coverage areas of adjacent BSs may overlap in order to accommodate handoffs. BSs may include schedulers for allocating radio resources.

Figure 3:
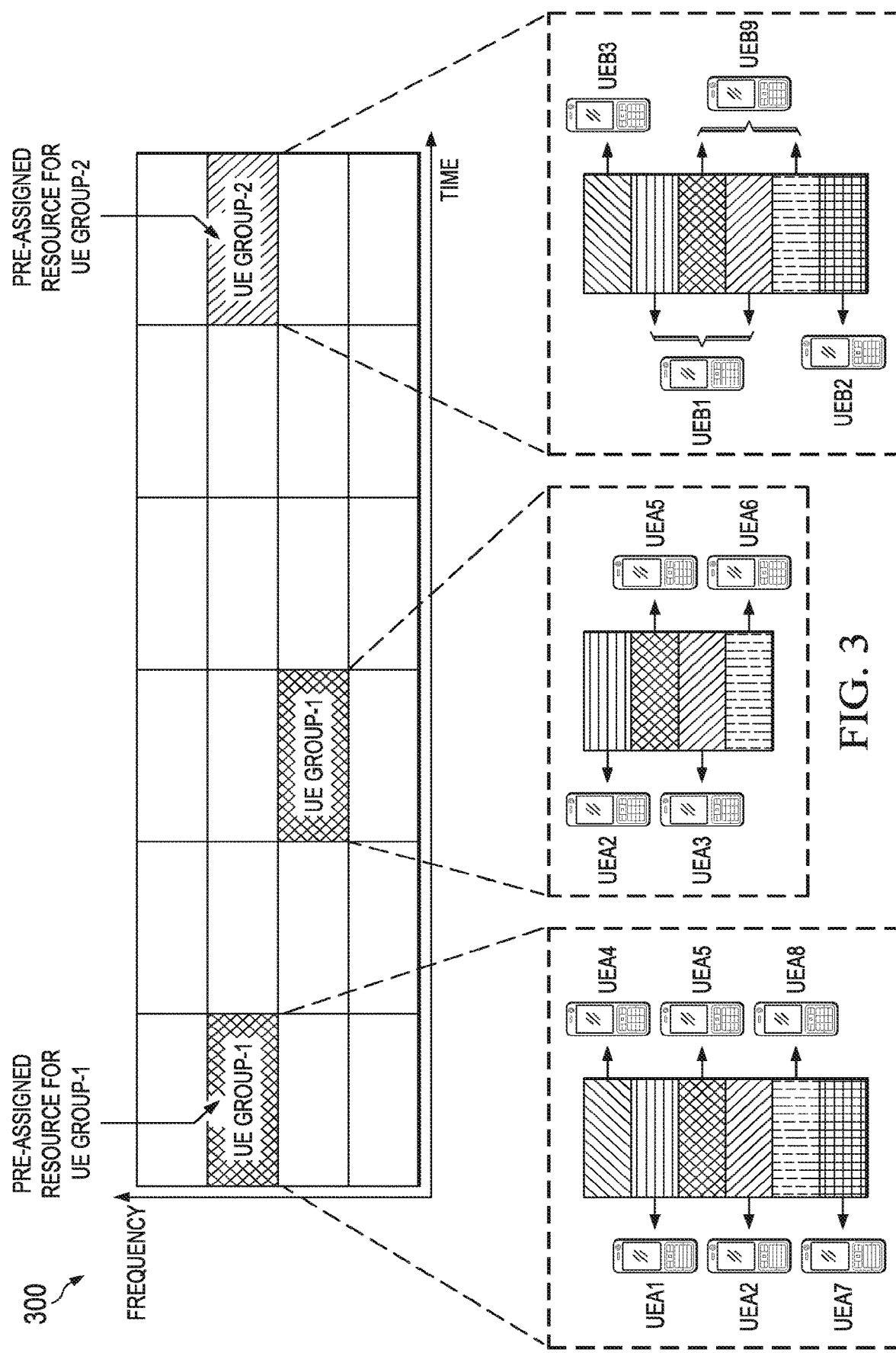
FIG. 3 illustrates a diagram of an embodiment downlink data channel for carrying grant free small packet transmissions.

FIG. 3 illustrates a downlink data channel 300 for carrying grant-free small packet transmissions. As shown, different groups of UEs are assigned different search spaces comprising time-frequency resources of the downlink data channel 300. Further, UEs within a given group are assigned individual transmission codes. Transmission codes may include various types of sequences, such as low density signatures, code division multiple access signatures, pseudo noise (PN) sequences, Zadoff-Chu sequences, Walsh-Hadamard codes, and others. In one embodiment, the transmission codes can be obtained from the codewords defined in a codebook or metrics. In an embodiment, individual transmission codes are assigned exclusively to individual UEs to achieve unicast transmission. In another embodiment, an individual codeword is assigned to a multicast group of users to achieve multicast transmission. The search space for a group of UEs may be defined, for example, as a specific downlink channel resources (e.g., time, frequency, spatial etc.) over which transmissions for the group are communicated. The search space may be assigned by the network or derived from a UE connection signature. The arrival time of the packet may be unpredictable, so multiple detection trials may be used. In various embodiments, multiple transmission codes and/or search spaces can be allocated to a UE requiring more bandwidth.

Figure 4:
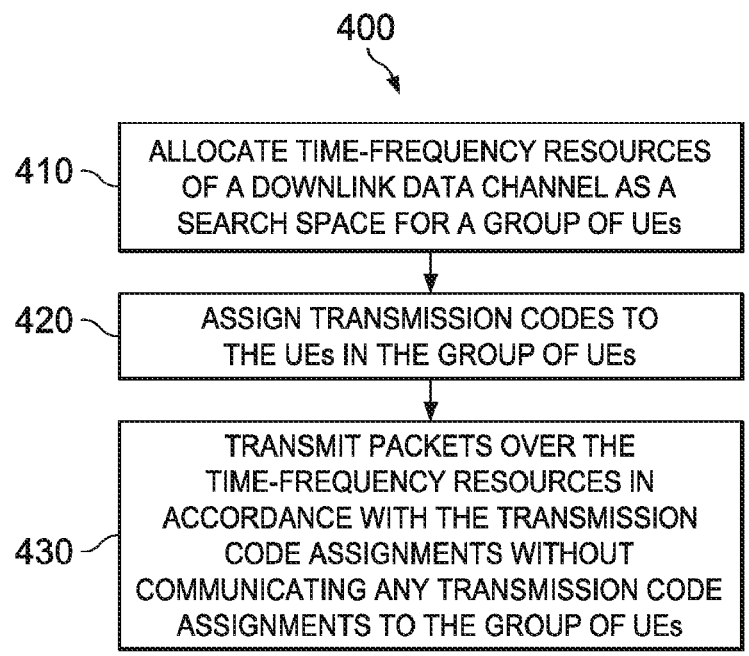
FIG. 4 illustrates a flowchart of an embodiment method for communicating grant free small packet transmissions in a downlink data channel.

FIG. 4 illustrates a method 400 for sending grant-free transmissions in a downlink data channel, as might be performed by a base station. As shown, the method 400 begins at step 410, where the base station allocates time frequency resources of a downlink data channel as a search space for a group of UEs. Thereafter, the method 400 proceeds to step 420, where the base station assigns candidate transmission codes to individual UEs in the group of UEs. Notably, while the transmission code assignments are known to the base station, the transmission code assignments are not communicated to UEs. Subsequently, the method 400 proceeds to step 430, where the base station transmits packets over the resources in accordance with the predefined codes. Notably, the packets are transmitted without communicating any transmission code assignments to the group of UEs.

Figure 5:
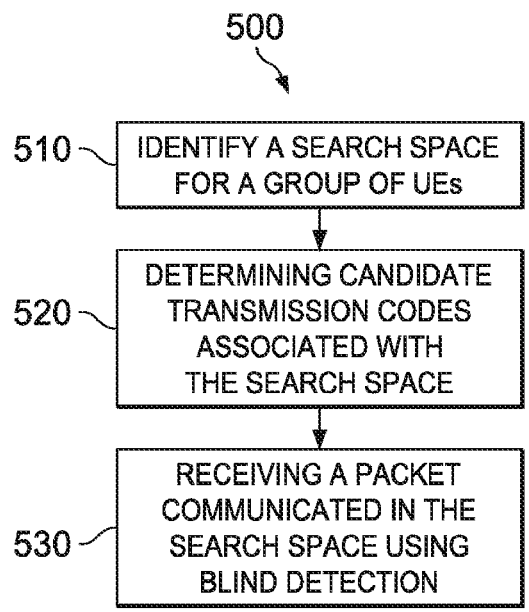
FIG. 5 illustrates a flowchart of an embodiment method for receiving grant free small packet transmissions in a downlink data channel.

FIG. 5 illustrates a method 500 for receiving grant-free transmissions in a downlink data channel, as might be performed by a mobile device. The mobile device may be a user equipment, a mobile station, or any other device configured to receive wireless transmissions from a base station. As shown, the method 500 begins with step 510, where the mobile device identifies a search space for a group of UEs to which the mobile device belongs. Thereafter, the method 500 proceeds to step 520, where the mobile station determines a set of candidate transmission codes associated with the search space. The set of candidate transmission codes may be identified via a priori information, or in accordance with control information communicated by the base station (e.g., during initialization, via a slow-signaling channel, etc.). Subsequently, the method 500 proceeds to step 530, where the mobile station receives a packet communicated in the search space using blind detection. More specifically, the mobile station may perform blind detection by decoding packets communicated in the search space using corresponding transmission codes in the set of candidate transmission codes. The mobile station may then perform a cyclic redundancy check (CRC) on each decoded packet to verify which of the packets was destined for the mobile station. In an embodiment, the packet destined for the mobile station includes an identifier associated with the mobile station, e.g., a UE identifier, etc. In another embodiment, the CRC is masked by a mobile device connection ID associated with the mobile device. In embodiments, the mobile station may be able to decode other UEs' packets if the mobile station has knowledge of the other UEs' information. Examples of such information are other UEs' IDs or a group ID. Embodiments of non-adaptive transmission include a predefined modulation level and/or a predefined possible coding level, and also a repetition pattern.

Figure 6:
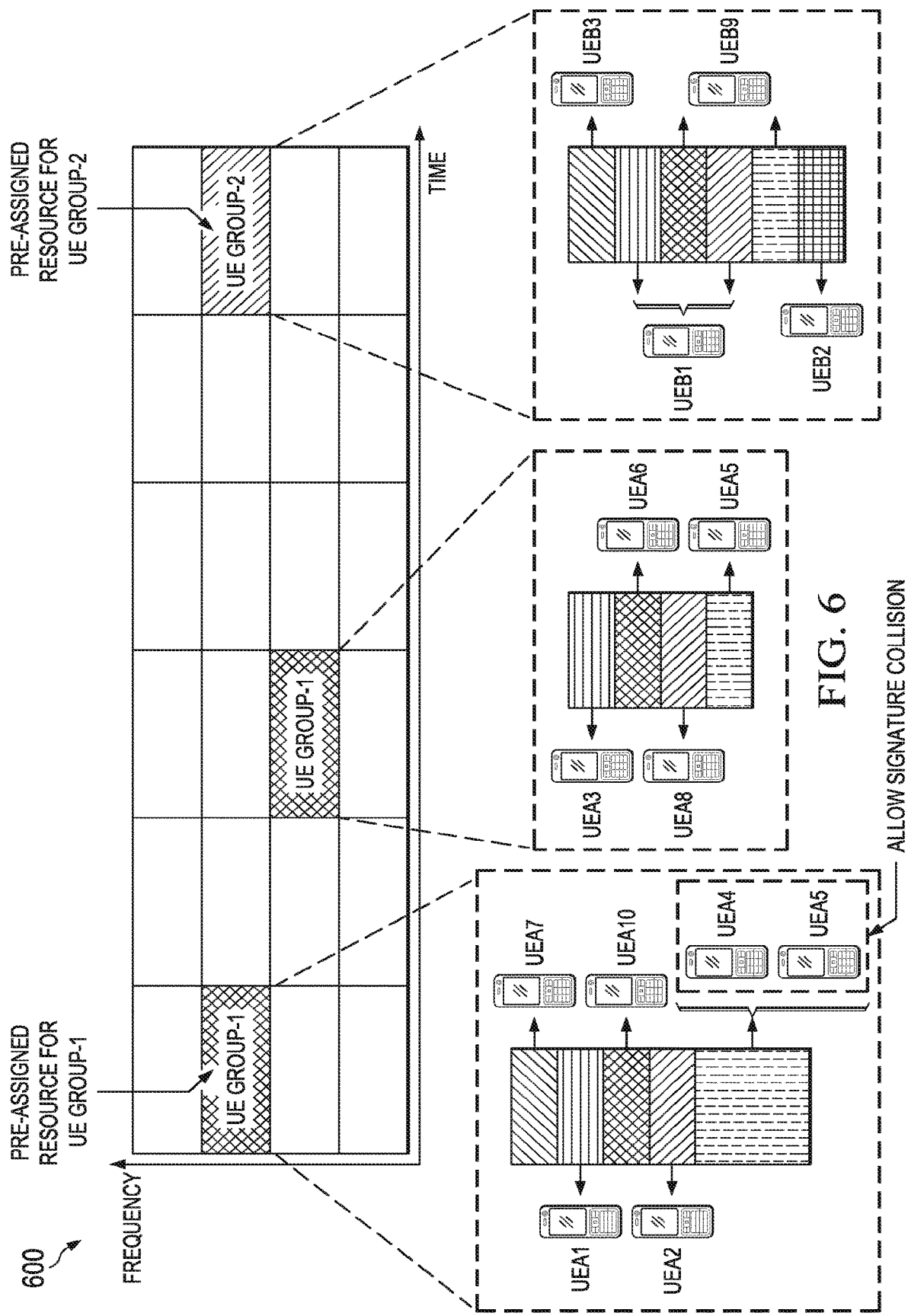
FIG. 6 illustrates a diagram of an embodiment downlink data channel for carrying grant free small packet transmissions.

FIG. 6 illustrates a diagram of an uplink data channel 600 for carrying grant free small packet transmissions. As shown, different groups of UEs are assigned different access spaces comprising time-frequency resources of the uplink data channel 600. Further, UEs within a given group are assigned individual access codes. The access codes may include various types of sequences, such as low density signatures, code division multiple access signatures, pseudo noise (PN) sequences, Zadoff-Chu sequences, Walsh-Hadamard codes, and others. In an embodiment, an individual access code is used by a single user to achieve contention-free access in the uplink channel. Alternatively, an individual access code is used by multiple users to perform transmissions over the access space in a contentious manner. The access space and/or access code may be assigned by the network or derived from a prior information or information communicated over a slow-signaling channel. In an embodiment, the information used to derive the access code/spaces are predefined rules known by the network and UEs, e.g. UE connection signatures, UE IDs, etc. In various embodiments, more access space and/or access codes can be assigned to a UE that needs more bandwidth. The base station detects the UL packets by trying all possible access codes assigned to the predefined access space. The base station identifies the UE through CRC checking or header identification. Embodiments of non-adaptive transmission include a predefined modulation level, a predefined possible coding level, a repetition pattern, or combinations thereof.

Figure 7:
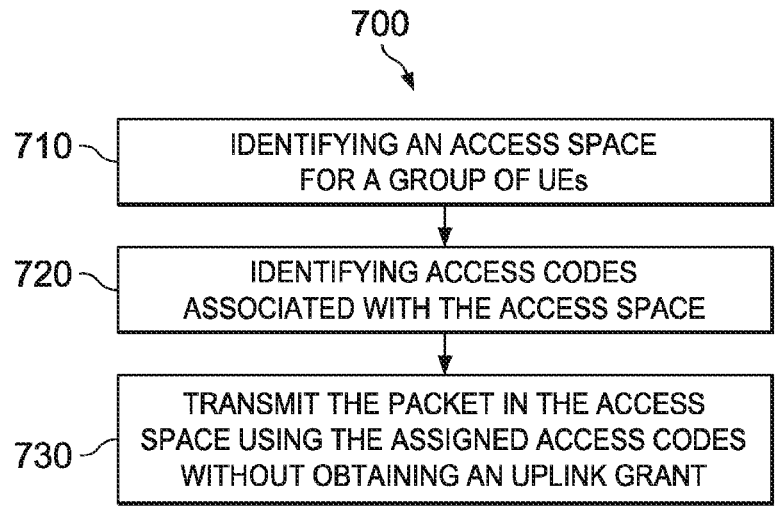
FIG. 7 illustrates a flowchart of an embodiment method for performing grant free small packet transmissions in an uplink data channel.

FIG. 7 illustrates a method 700 for sending grant free transmissions in an uplink data channel, as might be performed by a mobile station. As shown, the method 700 begins at step 710, the mobile station identifies an access space for a group of UEs. Thereafter, the method 700 proceeds to step 720, where the mobile station identifies assigned access codes associated with the access space. In an embodiment, the mobile station independently derives the assigned access code in accordance with some pre-defined rules known at the base station and mobile stations. In another embodiment, the assigned access code is communicated by the base station via a slow-signaling channel. In yet another embodiment, the mobile station derives the assigned access code from an access code set in accordance with some pre-defined rules such that the base station only needs to announce a pre-defined access code set comprising all possible codes associated with the predefined access resources. Subsequently, the method 700 proceeds to step 730, where the mobile station transmits the packet in the access space using the selected access code. The packet is transmitted without obtaining an uplink grant.

Figure 8:
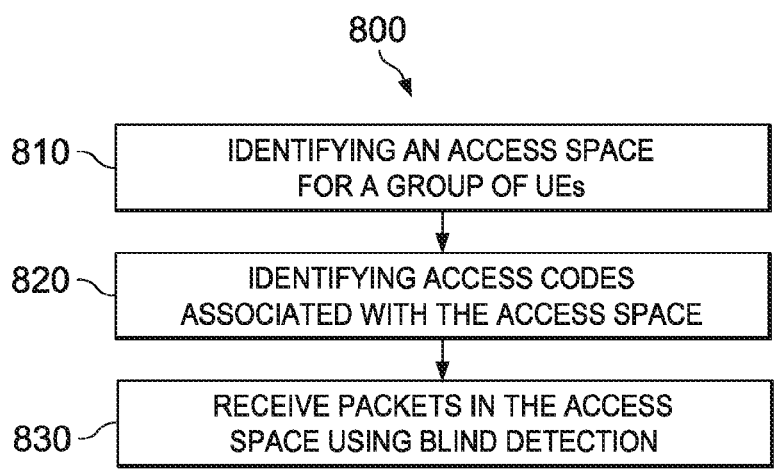
FIG. 8 illustrates a flowchart of an embodiment method for receiving grant free small packet transmissions over an uplink data channel.

FIG. 8 illustrates a method 800 for receiving grant-free transmissions in an uplink data channel, as might be performed by a base station. As shown, the method 800 begins with step 810, where the base station identifies an access space for a group of UEs to which the mobile device belongs. Thereafter, the method 800 proceeds to step 820, where the base station determines a set of candidate access codes associated with the access space. Subsequently, the method 800 proceeds to step 830, where the base station receives a packet communicated in the access space using blind detection. More specifically, the base station may perform blind detection by decoding packets communicated in the access space using corresponding access codes in the set of candidate access codes. The base station may then perform a cyclic redundancy check (CRC) on each decoded packet and identify the mobile station. In an embodiment, the packet destined for the base station includes an identifier associated with the mobile station, e.g., a UE identifier, etc. In another embodiment, the CRC is masked by a mobile device connection ID associated with the mobile device.

Access codes may be defined differently in various embodiments. For example, the network may define orthogonal pseudo-orthogonal code sets or codebooks, such as low density signature (LDS), code division multiple access (CDMA), pseudo-random noise (PN) sequence, Zadoff-chu (ZC) sequence, Walsh-Hadamard code, and other sparse multiple access codes. The code set or codebook may typically be known by both the base station and the mobile terminals. The mobile terminals may select one or multiple codes from the code set to transmit small packets.

A semi-static transmission mode configuration is signaled to the UE through the broadcast channel. The broadcast signaling may indicate whether a grant-free transmission mode is supported by the network, as well as traffic types or other parameters associated with the grant-free transmission mode. The network may support grant-free transmission mode in the downlink channel, the uplink channel, or both, and may indicate such capability via broadcast transmission (or otherwise). Additionally, the UE may advertise or otherwise indicate a grant-free transmission mode capability (or lack thereof) when accessing the network. For example, the UE may indicate whether the UE is capable of performing grant-free transmission over the uplink channel and/or receiving grant-free transmissions over the downlink channel. Modulation and Coding Scheme (MCS) settings can be updated through the broadcast channel or other slow-signaling channel. The search space and the access space for each UE may be determined by the network in accordance with the UE connection ID, geometry location, active traffic/service types, or other criteria. The defined search space and access space can be signaled to the UEs through the broadcast channel. The search space and access space can be updated and signaled to the UEs through the slow-signaling channel. The maximum size of code set and the formation of the code set can also be updated and signaled to the UE through the slow signaling channel.

Figure 9:
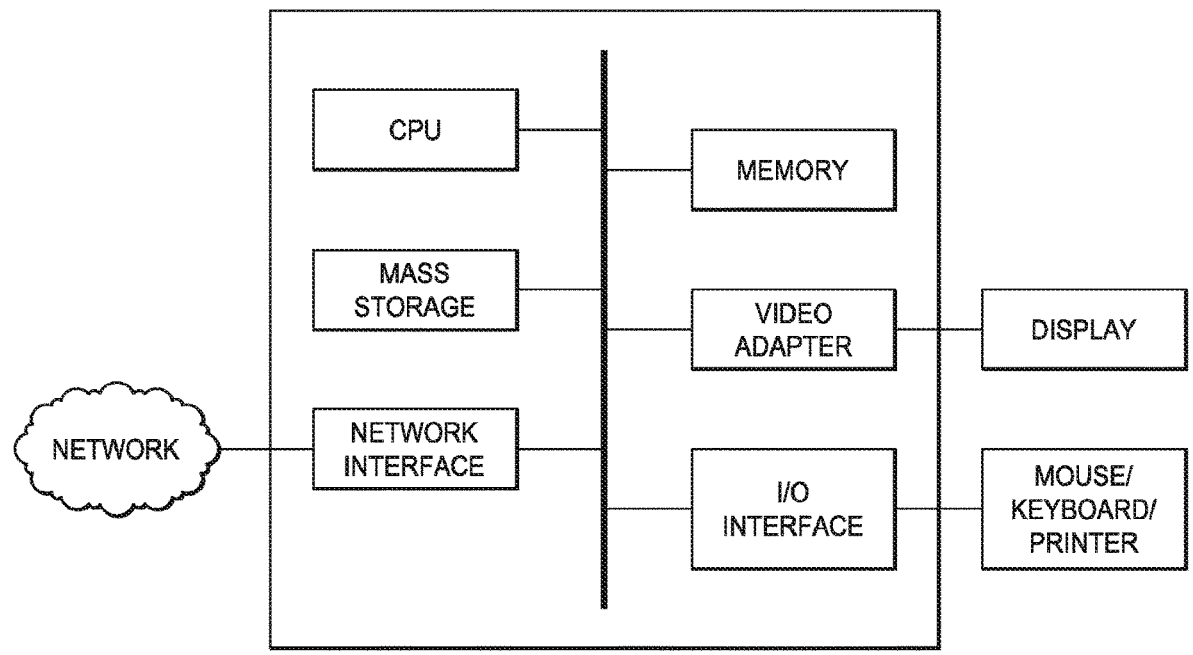
FIG. 9 illustrates a block diagram of an embodiment processing system.

FIG. 9 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an input/output (I/O) interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 10:
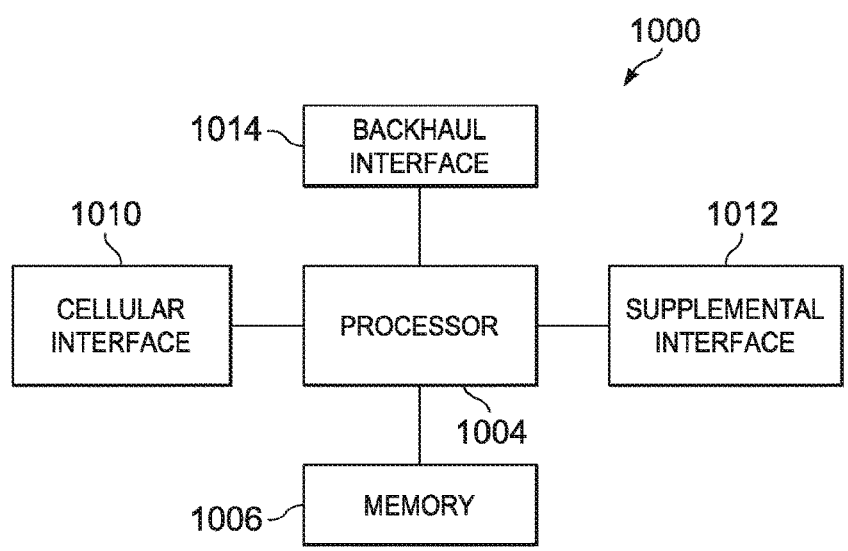
FIG. 10 illustrates a block diagram of an embodiment communications device.

FIG. 10 illustrates a block diagram of an embodiment of a communications device 1000, which may be equivalent to one or more devices (e.g., UEs, NBs, etc.) discussed above. The communications device 1000 may include a processor 1004, a memory 1006, a cellular interface 1010, a supplemental interface 1012, and a backhaul interface 1014, which may (or may not) be arranged as shown in FIG. 10. The processor 1004 may be any component capable of performing computations and/or other processing related tasks, and the memory 1006 may be any component capable of storing programming and/or instructions for the processor 1004. The cellular interface 1010 may be any component or collection of components that allows the communications device 1000 to communicate using a cellular signal, and may be used to receive and/or transmit information over a cellular connection of a cellular network. The supplemental interface 1012 may be any component or collection of components that allows the communications device 1000 to communicate data or control information via a supplemental protocol. For instance, the supplemental interface 1012 may be a non-cellular wireless interface for communicating in accordance with a Wireless-Fidelity (Wi-Fi) or Bluetooth protocol. Alternatively, the supplemental interface 1012 may be a wireline interface. The backhaul interface 1014 may be optionally included in the communications device 1000, and may comprise any component or collection of components that allows the communications device 1000 to communicate with another device via a backhaul network.

In accordance with an embodiment, a method for shared resource-based scheduling-free downlink (DL) small packet transmission is provided. In such an embodiment, the method includes defining a search space for a group of user equipments (UEs), defining a code set for overlaid multiple access, and transmitting, by a network controller, small packets targeted to different UEs belonging to the defined search space in accordance with a predefined modulation and coding scheme (MCS) setting. In one example, the search space is defined by the network controller. In another example, the code set is defined by the network controller. In yet another example, the method further comprises decoding the packets associated with all detected codes in the defined search space in accordance with the predefined MCS setting. In another example, the method further comprises identifying, by the UE, the packet(s) belonging to the UE from all the decoded packets, where a cyclic redundancy check (CRC) is masked with a UE connection ID or a packet header contains the UE connection ID.

In accordance with another embodiment, a method for contention-based grant-free uplink (UL) small packet transmission is provided. In this embodiment, the method includes defining an access space for a user equipment (UE), defining a code set for overlaid multiple access, transmitting, by the UE, small packets through the defined access space with predefined or randomly selected code(s) in accordance with a predefined modulation and coding scheme (MCS) setting, and decoding, by a network controller, the packet(s) belonging to the UE. In one example, the access space is defined by the network controller. In another example, the code set is defined by the network controller. In yet another example, the method further includes decoding, by the network controller, the packets associated with all detected codes in accordance with the predefined MCS setting. In any of the preceding examples, or in another example, the method further includes identifying packet(s) belonging to the UE from all the decoded packets, where a cyclic redundancy check (CRC) is masked with a UE connection ID or a packet header contains the UE connection ID.

In accordance with another embodiment, a method for communicating data is provided. In this embodiment, the method includes allocating resources of a downlink channel as a search space for a group of mobile devices, assigning a first transmission code to a first mobile device, and transmitting, by the base station, a packet over the resources in accordance with the first transmission code without communicating transmission code assignments to the first mobile device, where the first mobile device is configured to receive the packet using blind detection. In one example, the first transmission code comprises an orthogonal or quasi-orthogonal signature. In another example the first transmission code comprises at least one of a low density signature, a code division multiple access (CDMA) signature, a pseudo noise (PN) sequence, a Zadoff-Chu sequence, and a Walsh-Hadamard code. In yet another example, the first transmission code comprises a sparse multiple access code. In yet another example, the packet includes at least some data that is not control information. In yet another example, the transmitting the packet over the resources of the downlink channel comprises transmitting the packet in accordance with multiple transmission codes.

In yet another example, the search space comprises time-frequency resources of the downlink channel. In yet another example, the search space comprises spatial resources of the downlink channel. A base station for performing this method is also provided.

In accordance with another embodiment, a method for communicating data is provided. In this embodiment, the method includes identifying a search space for a group of mobile devices, where the group of mobile device includes at least a first mobile device, and the search space comprises resources of a downlink channel. The method further includes determining a set of candidate transmission codes associated with the search space, and receiving, by the first mobile device, a packet communicated in the search space using blind detection, where the packet is communicated in accordance with a first transmission code in the set of candidate transmission codes. In one example, receiving the packet using blind detection comprises: receiving, by the first mobile device, the packet without knowing beforehand which transmission code in the set of candidate transmission codes was used to communicate the packet.

In another example, receiving the packet using blind detection comprises: decoding, by the first mobile device, a plurality of packets communicated in the search space using a corresponding transmission code in the set of candidate transmission codes, where each packet is communicated in accordance with a different transmission code in the set of candidate transmission codes; and determining which of the decoded packets carries an identifier associated with the first mobile device.

In one example, the search space comprises time-frequency resources of the downlink channel. In another example, the search space comprises spatial resources of the downlink channel. In accordance with another embodiment, a method for communicating data is provided. In this example, the method includes identifying an access space for a group of mobile devices, the access space comprising resources of an uplink channel, wherein the group of mobile devices comprise at least a first mobile device; determining a first transmission code in a set of transmission codes for the first mobile device; and transmitting, by the first mobile device, a packet over the resources of the uplink channel using the first transmission code without obtaining an uplink grant.

In one example, the first transmission code comprises an orthogonal or quasi-orthogonal signature. In the same example, or a different example, the first transmission code comprises at least one of a low density signature, a code division multiple access (CDMA) signature, a pseudo noise (PN) sequence, a Zadoff-Chu sequence, and a Walsh-Hadamard code. In any of the preceding examples, or in another example, the first transmission code comprises a sparse multiple access code. In any of the preceding examples, or in another example, the first transmission code is assigned exclusively to the first mobile device without being assigned to other mobile devices in the group of mobile devices. In any of the preceding examples, or in another example, the first transmission code is assigned to multiple mobile devices in the group of mobile devices. In any of the preceding examples, or in another example, transmitting the packet over the resources using the first transmission code comprises transmitting, by the first mobile device, the packet over the resources of the uplink channel using the first transmission code; and re-transmitting the packet if a collision resulted from the earlier transmission.

In any of the preceding examples, or in another example, determining the first transmission code for the first mobile device comprises: independently deriving the first transmission code by the first mobile device in accordance with a connection signature of the first mobile device. In any of the preceding examples, or in another example, determining the first transmission code for the first mobile device comprises: receiving, by the first mobile, a transmission code assignment over a slow-signaling channel, the slow-signaling channel being communicated less frequently than a control channel used to communicate uplink grant information.

In any of the preceding examples, or in another example, the access space comprises time-frequency resources of the uplink channel. In any of the preceding examples, or in another example, the access space comprises spatial resources of the uplink channel.

In accordance with another embodiment, a method for communicating data is provided. In this embodiment, the method includes identifying an access space for a group of mobile devices, the access space comprising resources of an uplink channel; identifying a set of transmission codes associated with access space; and receiving, by a base station, packets communicated over the resources of the uplink channel using blind detection.

In one example, the packets are received without communicating uplink grant information to the group of mobile devices. A base station for performing this method is also provided. In accordance with another embodiment, a method for communicating capability information is provided. In such an embodiment, the method includes communicating capability information between a mobile device and a base station, the capability information indicating a grant-free communication mode capability; and communicating grant-free signaling parameters between the mobile device and the base station, the grant-free signaling parameters defining a search space or an access space for the grant-free communication mode.

In one example, the grant-free communication mode capability indicates that the base station supports grant-free communications over an uplink or downlink channel. In another example, the grant-free communication mode capability indicates that the mobile device is capable of performing grant-free communications over an uplink channel, receiving grant-free communications over a downlink channel, or both. In yet another example, communicating grant-free signaling parameters between the mobile device and the base station comprises communicating the grant-free signaling parameters over a slow-signaling channel, the slow-signaling channel being communicated less frequently than a control channel used to communicate uplink grant information. In yet another example, the grant-free signaling parameters include a set of candidate transmission codes.

In accordance with another embodiment, a method for communicating data is provided. In this example, the method includes receiving a slow signaling channel indicating a first transmission resource associated with a first access space comprising a first time-frequency resource of an uplink channel, and transmitting a data packet over the first time-frequency resource of the uplink channel with a pre-defined modulation and coding scheme (MCS) setting, where the MCS setting being is updated through a broadcast channel or the slow-signaling channel.

In one example, the slow-signaling channel is communicated less frequently than a control channel used to communicate uplink grant information. In another example, the slow signaling channel further indicates an access code associated with the first access space. In yet another example, the access code is associated with defining any one of signature, sequence and code. In yet another example, the first access space is used by multiple mobile devices comprising the first mobile device. In yet another example transmitting the data packet over the first time-frequency resource using the access code includes transmitting, by the first mobile device, the packet over the first access space of the uplink channel using the access code; and re-transmitting the packet if a collision resulted from the earlier transmission. In yet another example, a cyclic redundancy check (CRC) is masked with a UE connection ID or a packet header contains the UE connection ID in the data packet.

In yet another example, the method further includes communicating capability information with a network entity, and obtaining, by the first mobile device, grant free signaling parameters from the network entity, where the capability information indicates a grant free communication mode capability, and the grant free signaling parameters defines the first access space for the grant free communication mode. A mobile device for performing this method is also provided.

In accordance with another embodiment, a method for communicating is provided. In this embodiment, the method includes sending to a mobile device a slow signaling channel indicating a first transmission resource associated with a first access space comprising a first time-frequency resource of an uplink channel, and receiving a data packet over the first time-frequency resource of the uplink channel with a pre-defined modulation and coding scheme (MCS) setting, where the MCS setting is updated through a broadcast channel or the slow-signaling channel. In one example, the slow-signaling channel being is communicated less frequently than a control channel used to communicate uplink grant information. In another example, the slow signaling channel further indicates an access code associated with the first access space. In another example, the access code is associated with defining any one of signature, sequence and code. In another example, the first access space is used by multiple mobile devices comprising the first mobile device. In another example, a cyclic redundancy check (CRC) is masked with a UE connection ID or a packet header contains the UE connection ID in the data packet. A base station for performing this method is also provided.

In accordance with another embodiment, a method for communicating is provided. In such an embodiment, the method includes receiving a semi-static signaling indicating a first transmission resource associated with a first access space comprising a first time-frequency resource of an uplink channel and an access code associated with the first access space, and transmitting, by the first mobile device, a data packet over the first time-frequency resource of the uplink channel using the access code without receiving a grant-based signaling for the first time-frequency resource over a physical downlink control channel, where the data packet carries a UE connection ID marked with a cyclic redundancy check (CRC). In one example, the semi-static signaling is communicated less signaling overhead than dynamic scheduling. In another example, the access code is any one of signature, sequence and code. In yet another example, the first access space is used by multiple mobile devices comprising the first mobile device. In yet another example, the access space and the access code are pre-defined or communicated over a slow-signaling channel. In yet another example, the access code is exclusively used by the first mobile device without being used by other mobile devices in the first group of mobile devices. In yet another example, transmitting the data packet over the first time-frequency resource using the access code comprises: transmitting, by the first mobile device, the packet over the first access space of the uplink channel using the access code; and re-transmitting the packet if a collision resulted from the earlier transmission. In yet another example, the method further includes communicating, by the first mobile device, capability information with a network entity; and obtaining, by the first mobile device, grant free signaling parameters from the network entity, where the capability information indicates a grant free communication mode capability, and the grant free signaling parameters defines the first access space for the grant free communication mode. A mobile device for performing this method is also provided.

In accordance with another embodiment, a method for communicating is provided. In this embodiment, the method includes sending a semi-static signaling indicating a first transmission resource associated with a first access space comprising a first time-frequency resource of an uplink channel and an access code associated with the first access space, and receiving a data packet over the first time-frequency resource of the uplink channel using the access code without sending a grant-based signaling for the first time-frequency resource over a physical downlink control channel; and decoding, by the base station, the data packet based on the access code associated with the first access space, where the data packet carries a UE connection ID marked with a cyclic redundancy check (CRC).

In one example, the semi-static signaling includes less signaling overhead than dynamic scheduling. In another example, the semi-static signaling access code is any one of signature, sequence and code. In yet another example, the first access space is used by multiple mobile devices comprising the first mobile device. In yet another example, the access space and the access code are pre-defined or communicated over a slow-signaling channel. In yet another example, the access code is exclusively used by the first mobile device without being used by other mobile devices in the first group of mobile devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
receiving, by a mobile device over a slow signaling channel that is different than a Physical downlink control channel (PDCCH) and is communicated less frequently than the PDCCH, information indicating a transmission resource comprising a time-frequency resource of an uplink channel and indicating an access code associated with an access space; and
performing, by the mobile device, a grant free uplink transmission over the time-frequency resource of the uplink channel using the access code, wherein the grant free uplink transmission is performed without receiving a grant based signaling message assigning the time-frequency resource to the mobile device over the PDCCH, wherein a cyclic redundancy check (CRC) masked with a mobile device ID is appended to a data packet carried by the grant free uplink transmission, the mobile device ID assigned to the mobile device.

2. The method of claim 1, wherein the slow signaling channel uses less signaling overhead to indicate the transmission resource than dynamic scheduling.

3. The method of claim 1, wherein the access code is any one of a signature, a sequence and a code.

4. The method of claim 1, wherein the transmission resource is associated with the access space used by multiple mobile devices comprising the mobile device.

5. The method of claim 4, wherein the access space and the access code are pre-defined or communicated over a slow-signaling channel.

6. The method of claim 1, wherein the access code is exclusively used by the mobile device without being used by other mobile devices in a group of mobile devices.

7. The method of claim 1, wherein performing the grant free uplink transmission over the time-frequency resource using the access code comprises:
transmitting, by the mobile device, the data packet over the time-frequency resource of the uplink channel using the access code; and
re-transmitting the data packet if a collision resulted from the earlier transmission.

8. The method of claim 1, wherein the method further comprises:
communicating, by the mobile device, capability information with a network entity, wherein the capability information indicates a grant free communication mode capability.

9. A mobile device comprising:
a processor; and
a computer readable storage medium storing programming for execution by the processor, the programming including instructions to:
receive, over a slow signaling channel that is different than a physical downlink control channel (PDCCH) and is communicated less frequently than the PDCCH, information indicating a transmission resource comprising a time-frequency resource of an uplink channel and indicating an access code associated with an access space; and
perform a grant free uplink transmission over the time-frequency resource of the uplink channel using the access code, wherein the grant free uplink transmission is performed without receiving a grant based signaling message assigning the time-frequency resource to the mobile device over the PDCCH, wherein a cyclic redundancy check (CRC) masked with a mobile device ID is appended to a data packet carried by the grant free uplink transmission, the mobile device ID assigned to the mobile device.

10. The mobile device of claim 9, wherein the slow signaling channel uses less signaling overhead to indicate the transmission resource than dynamic scheduling.

11. The mobile device of claim 9, wherein the access code is any one of a signature, a sequence and a code.

12. The mobile device of claim 9, wherein the transmission resource is associated with the access space used by multiple mobile devices comprising the mobile device.

13. The mobile device of claim 12, wherein the access space and the access code are pre-defined or communicated over a slow-signaling channel.

14. The mobile device of claim 9, wherein the access code is exclusively used by the mobile device without being used by other mobile devices in a group of mobile devices.

15. A method comprising:
sending, by a base station to a mobile device over a slow signaling channel that is different than a physical downlink control channel (PDCCH) and is communicated less frequently than the PDCCH, information indicating a transmission resource comprising a time-frequency resource of an uplink channel and indicating an access code associated with an access space;
receiving, by the base station, a grant free uplink transmission carrying a data packet over the time-frequency resource of the uplink channel using the access code without sending a grant based signaling message assigning the time-frequency resource to the mobile device over the PDCCH; and
decoding, by the base station, the data packet based on the access code associated with the access space, wherein a cyclic redundancy check (CRC) masked with a mobile device ID is appended to the data packet, the mobile device ID assigned to the mobile device.

16. The method of claim 15, wherein the slow signaling channel uses less signaling overhead to indicate the transmission resource than dynamic scheduling.

17. The method of claim 15, wherein the access code is any one of a signature, a sequence and a code.

18. The method of claim 15, wherein the transmission resource is associated with the access space used by multiple mobile devices comprising the mobile device.

19. The method of claim 18, wherein the access space and the access code are pre-defined or communicated over a slow-signaling channel.

20. The method of claim 15, wherein the access code is exclusively used by the mobile device without being used by other mobile devices in a group of mobile devices.

21. A base station comprising:
a processor; and
a computer readable storage medium storing programming for execution by the processor, the programming including instructions to:
send, to a mobile device over a slow signaling channel that is different than a physical downlink control channel (PDCCH) and is communicated less frequently than the PDCCH, information indicating a transmission resource comprising a time-frequency resource of an uplink channel and indicating an access code associated with an access space;

receive a grant free uplink transmission carrying a data packet over the time-frequency resource of the uplink channel using the access code without sending a grant based signaling message assigning the time-frequency resource to the mobile device over the PDCCH; and decode the data packet based on the access code associated with the access space, wherein a cyclic redundancy check (CRC) masked with a mobile device ID is appended to the data packet, the mobile device ID assigned to the mobile device.

22. The base station of claim 21, wherein the slow signaling channel uses less signaling overhead to indicate the transmission resource than dynamic scheduling.

23. The base station of claim 21, wherein the access code is any one of a signature, a sequence and a code.

24. The base station of claim 21, wherein the transmission resource is associated with the access space used by multiple mobile devices comprising the mobile device.

25. The base station of claim 24, wherein the access space and the access code are pre-defined or communicated over a slow-signaling channel.

26. The base station of claim 21, wherein the access code is exclusively used by the mobile device without being used by other mobile devices in a group of mobile devices.

\* \* \* \* \*

UNITED STATES PATENT AND TRADEMARK OFFICE
CERTIFICATE OF CORRECTION

PATENT NO. : 10,945,244 B2
APPLICATION NO. : 15/962637
DATED : March 9, 2021
INVENTOR(S) : Kelvin Kar Kin Au Page 1 of 1

It is certified that error appears in the above-identified patent and that said Letters Patent is hereby corrected as shown below:

In the Claims

Column 13, Line 14, Claim 1, delete "Physical" and insert --physical--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*